United States Patent [19]
Weber et al.

[11] 3,789,210
[45] Jan. 29, 1974

[54] RECESSED LIGHTED ASSIST BAR

[75] Inventors: Carl Weber, Battle Creek; Larry L. Shroyer, Union City; James T. Baker, Marshall, all of Mich.

[73] Assignee: Progressive Dynamics, Inc., Marshall, Mich.

[22] Filed: Mar. 16, 1973

[21] Appl. No.: 342,268

[52] U.S. Cl............... 240/7.3, 240/2 W, 240/7.1 R
[51] Int. Cl............................................. B60g 1/24
[58] Field of Search.......... 240/7.3, 7.1 R, 7.25, 8.2, 240/8.26, 2 R, 2 W

[56] References Cited
UNITED STATES PATENTS

| | | |
|---|---|---|
| 2,479,500 | 8/1949 | Longberg............................ 240/2 W |
| 3,183,343 | 5/1965 | Blum.................................... 240/2 R |
| 3,569,689 | 3/1971 | Nestrock............................. 240/2 W |
| 961,887 | 6/1910 | McAloney.......................... 240/7.25 |

*Primary Examiner*—Richard L. Moses
*Attorney, Agent, or Firm*—Beaman & Beaman

[57] ABSTRACT

A hand hold assist bar unit for mounting in vertical panels, particularly suitable for mounting in the exterior wall or panel of recreational vehicles adjacent an access door, the unit being of a recessed configuration having peripherally disposed mounting flanges. An electric lamp within the recess illuminates the same, and a hand hold bar extending across the recess may be readily grasped. A lens mounted on the unit body diffuses the light, and the unit also functions as a porch light.

7 Claims, 6 Drawing Figures

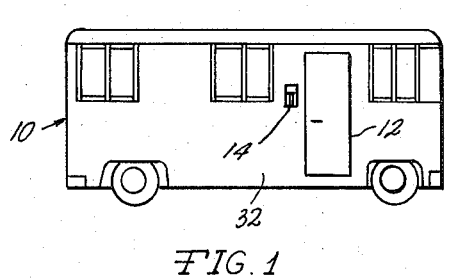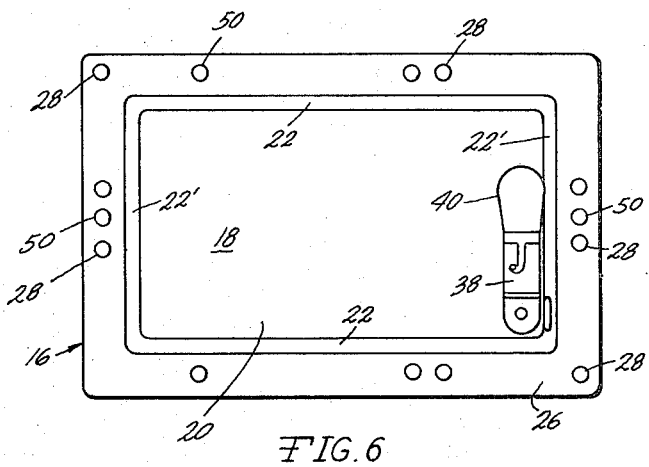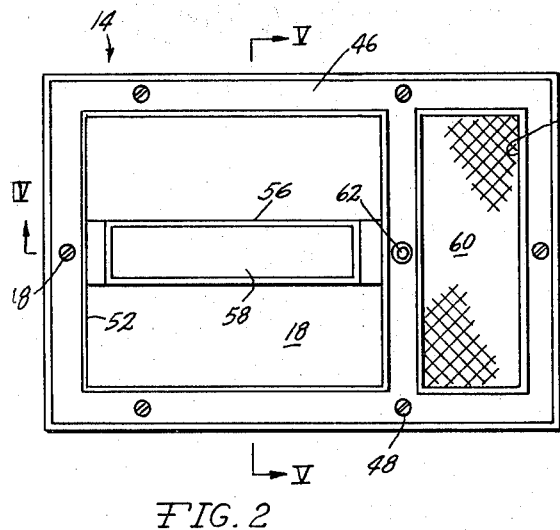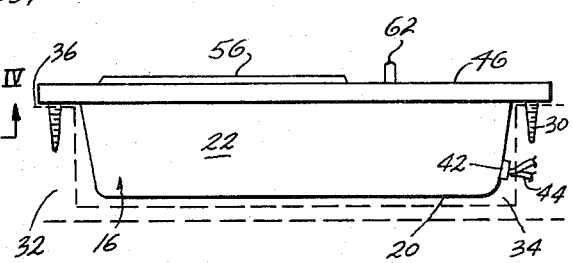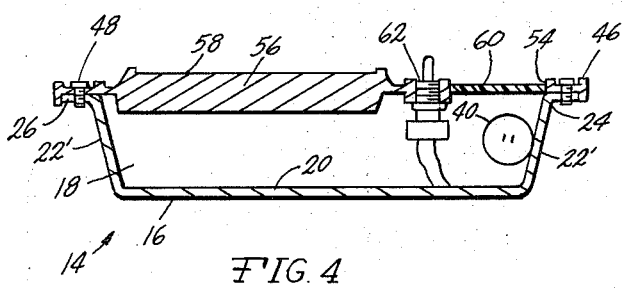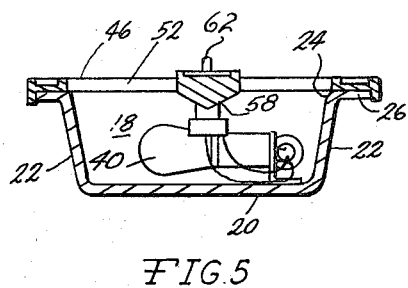

RECESSED LIGHTED ASSIST BAR

BACKGROUND OF THE INVENTION

The invention pertains to illuminated assist units for mounting in vertical panels as an aid to individuals ascending or descending steps or stairs.

Recreational vehicles, such as motor homes, pickup truck mounted campers, and travel trailers, employ doors for passenger ingress and regress often having a threshold located above ground level at a height requiring special effort and dexterity. As an aid in this regard such recreational vehicles often employ an auxiliary step, or steps, to permit easier passenger movement through the door. As an additional aid, a hand hold located adjacent the vehicle door is of considerable benefit, but an acceptable unit for recreational vehicle use has not previously been available.

As a hand hold assist bar mounted adjacent the door of recreational vehicles would usually be located on the lateral side of the vehicle, the protrusion of the same from the vehicle wall or panel produces a safety hazard, and such protrusions are discouraged by recreational vehicle safety requirements.

Additionally, conventional types of handles have the disadvantage of producing localized stress points on the vehicle panel, and as considerable forces may be applied to the assist bar during passenger ingress, the mounting of an assist bar in such a manner as to produce localized stresses may result in the bar being pulled from the vehicle panel.

Further, as passenger movement through the vehicle often takes place at night, the presence of an assist bar may not be apparent to those unfamiliar with the vehicle unless illumination thereof is provided.

SUMMARY OF THE INVENTION

It is an object of the invention to provide an assist bar for mounting in the panels of recreational vehicles which will aid passenger movement through the vehicle door, which is of such configuration as to be easily used, prevents the forming of localized stress points, and is illuminated.

A further object of the invention is to provide a recessed lighted assist bar which meets the safety requirements for recreational vehicles, is attractive in appearance, economical to manufacture, and is illuminated such that the bar and the area adjacent the recreational vehicle door is lighted for safety purposes.

The unit in accord with the invention is of a recessed or dished shape including a peripheral flange having mounting holes located therein. The recessed body is adapted to be inserted within an opening within the vehicle panel adjacent a door, and the flange is of sufficient dimensional configuration as to permit the mounting fasteners to be spaced from each other removing localized stress points.

In the disclosed embodiment the recessed body member is of a rectangular configuration having a maximum vertical dimension, and a hand hold bar extends across the body member spaced from the recessed portion, wherein the bar may be readily grasped without interference from the body member. A lamp is mounted within the recess adjacent one end thereof, and a light transmitting lens is located adjacent the lamp for improving the appearance, and diffusing the light. The lamp is so disposed in the recessed portion of the body, and the lens is of such location and configuration that both the recess and the area adjacent the unit is illuminated.

In the disclosed embodiment the hand hold bar is mounted in a cover plate attached to the body unit, and the lens and an electric switch for the lamp, is likewise located in the cover plate.

BRIEF DESCRIPTION OF THE DRAWINGS

The aforementioned objects and advantages of the invention will be appreciated from the following description and accompanying drawings wherein:

FIG. 1 is a side, elevational view of a recreational motor home utilizing a recessed lighted assist bar in accord with the invention, FIG. 2 is an elevational view of the unit with the cover plate in place, FIG. 3 is a bottom view with the vehicle wall panel illustrated in dotted lines, FIG. 4 is an elevational, sectional view of the invention as taken along Section IV—IV of FIG. 2, FIG. 5 is an elevational, sectional view as taken along Section V—V of FIG. 2, and FIG. 6 is an elevational view of the body member with the cover plate removed.

DESCRIPTION OF THE PREFERRED EMBODIMENT

FIG. 1 illustrates a typical use of the assist bar unit of the invention. The motor home 10 includes the usual side-mounted passenger access door 12, which is hinged at the right. The recessed lighted assist bar unit, generally indicated at 14, is mounted adjacent the door 12 at a vertical height readily reachable by an individual standing on the ground beside the door, and functions as an aid to the passneger entering the vehicle. Of course, the unit 14 may also be used as an aid in passenger egress, particularly if the passenger is backing from the door.

The unit in accord with the invention includes a body 16 which may be formed of steel, or could be formed of a synthetic plastic material. The body 16 includes a recessed central portion 18 defined by a base wall 20, and sidewalls 22. As will be appreciated from FIG. 6, the recessed portion 18 is of a generally rectangular configuration having a maximum vertical dimension such that the sidewalls 22' constitute end walls defining the maximum dimension of the recessed portion. The sidewalls 22 and 22' include outwardly extending terminating portions 24 from which a peripheral flange 26 extends, FIGS. 4 and 5. The flange 26 is spaced from the base wall 20, and is substantially parallel thereto, and is of a planar form. The flange 26 radially extends outwardly from the recessed portion 18.

A plurality of mounting holes 28 are defined in the mounting flange permitting screws or bolts 30, FIG. 3, to extend through the flange for connection to the sidewall panel 32 of the recreational vehicle.

With reference to FIG. 3, the vertical sidewall panel 32 of the recreational vehicle is provided with a recess 34 of sufficient dimension to receive the body recessed portion 18 and the flange 26 overlies the exterior panel surface 36 such that screws 30 extending through the mounting holes 38 will be directly received within the panel.

A lamp socket 38 is affixed to the body 18 adjacent one of the end sidewalls 22', and receives the electric lamp bulb 40, which will be located within the recessed portion. An insulating grommet 42 is defined in an opening within the adjacent end sidewall and conductors 44 are connected to the vehicle electrical system.

A cover plate 46 of a rectangular configuration is mounted upon the body 16 by bolts 48 received within holes 50 defined in the flange 26. The cover plate 46 may be of a decorative finish, such as chromed or painted. The cover plate has defined thereon two rectangular openings 52 and 54. The opening 52 is divided into two portions by the hand hold bar 56 extending thereacross, and as will be appreciated from FIG. 4, the bar 56 may be integrally formed of the material of the cover plate. The hand bar is of sufficient dimension and strength as to be comfortably grasped, and may include a recessed portion 58 for receiving a decorative panel of vinyl, or the like.

The opening 54 receives a translucent lens 60 transmitting light emitting from the bulb 40 to the area adjacent the unit. It will be appreciated that the lens 60 is disposed immediately adjacent the bulb and prevents the bulb from being visible, thereby enhancing the appearance but permitting optimum use of the light emitted.

An electric push button switch 62 may be mounted within the cover plate 46 and is connected to the conductors 44, and bulb 40 by electric wires for energizing the lamp bulb as desired.

In the preferred embodiment the body 16 and the cover plate 46 are formed of metal, but such components may be formed of high strength synthetic material without departing from the spirit of the invention.

As the hand hold bar 56 is disposed over the recessed portion 18 the body 16 does not interfere with grasping of the bar, and the construction permits an effective assist bar to be mounted to the vertical panel of a recreational vehicle without any significant projection beyond the vehicle sidewall panel, as appreciated from FIG. 3.

Various modifications of the inventive concept may be apparent to those skilled in the art without departing from the spirit and scope of the invention.

We claim:

1. A recessed lighted assist bar unit for mounting within a vertically disposed panel having an outer surface comprising, in combination, a dish shaped body including a recessed central region having a base wall and sidewalls, a flange extending from at least two sidewalls located at opposed portions of said recessed central region and spaced from said base wall, a manually grippable hand hold bar mounted on said body extending across said recessed central region and in spaced relationship to said base wall, an electric lamp mounted on said body, and a light transmitting lens mounted on said body adjacent said lamp.

2. In a recessed lighted assist bar unit as in claim 1, body mounting means defined in said flanges.

3. In a recessed lighted assist bar unit as in claim 1 wherein said sidewalls are four in number defining a rectangular recess, said sidewalls including terminating edges, said flange being of rectangular peripheral configuration and extending from said sidewalls' terminating edges, and mounting means defined in said flange.

4. In a recessed lighted assist bar unit as in claim 1 wherein said lamp is mounted within said recessed central portion and illuminates the same.

5. In a recessed lighted assist bar unit as in claim 1 wherein said recessed central portion is of a rectangular configuration having a maximum longitudinal dimension defined by end sidewalls, said lamp being mounted within said recessed central portion adjacent an end sidewall illuminating said recessed portion, said hand hold bar extending across said recessed central portion in the direction of maximum dimension.

6. In a recessed lighted assist bar unit as in claim 1, a cover plate mounted upon said body superimposed over said recessed central portion and said flanges, said hand hold bar and lens being mounted on said cover plate.

7. In a recessed lighted assist bar unit as in claim 6, an electric switch mounted upon said cover plate and electric conductors connecting said switch to said lamp.

* * * * *